United States Patent
Bruchner et al.

[19]

[11] Patent Number: 5,820,503
[45] Date of Patent: Oct. 13, 1998

[54] TENSIONER FOR TRACTION MEANS WITH PREDEFINED TENSIONING DISPLACEMENT

[75] Inventors: Klaus Bruchner, Ebersbach; Ralf Kaufmann, Stuttgart; Manfred Bonkowski, Wedemark; Michael Huss, Nurnberg, all of Germany

[73] Assignee: Ina Walzlager Schaeffler oHG, Germany

[21] Appl. No.: 916,689

[22] Filed: Aug. 22, 1997

[30] Foreign Application Priority Data

Aug. 24, 1996 [DE] Germany ............ 196 34 343.7

[51] Int. Cl.[6] ........................................ F16H 7/08
[52] U.S. Cl. .................................. 474/112; 474/133
[58] Field of Search ............................ 474/101, 112, 474/133

[56] References Cited

U.S. PATENT DOCUMENTS

| | | | |
|---|---|---|---|
| 2,909,074 | 10/1959 | Scheiterlein | 474/112 X |
| 4,816,012 | 3/1989 | Bytzek | 474/112 X |
| 5,064,405 | 11/1991 | St. John | 474/133 |
| 5,266,067 | 11/1993 | Gapco | 474/112 |
| 5,370,585 | 12/1994 | Thomey et al. | 474/112 |
| 5,399,124 | 3/1995 | Yamamoto et al. | 474/94 |

FOREIGN PATENT DOCUMENTS

| | | |
|---|---|---|
| 2664343 | 1/1992 | France . |
| 2617368 | 2/1977 | Germany . |
| 3719479 | 12/1988 | Germany . |
| 3908818 | 7/1990 | Germany . |

OTHER PUBLICATIONS

Patent Abstracts of Japan, JP 2–118251, M–1001, Jul. 23, 1990, vol. 14, No. 339.

*Primary Examiner*—Thomas R. Hannon
*Attorney, Agent, or Firm*—Bierman, Muserlian and Lucas

[57] ABSTRACT

A tensioner for a traction means, particularly a belt (7), comprises a protective plate (1) which is displaceable relative to a stationary machine element, the tensioner further comprises a tension roller (2) mounted rotatably on a bearing pin (3) for contacting the belt (7) and to obtain a perfect tensioning of the belt, the bearing pin (3) comprises an eccentric (5) which is received on the protective plate (1), the longitudinal axes of the eccentric (5) and the bearing pin (3) being spaced from one another by an eccentricity e, and a pivoting of the bearing pin (3) about the eccentric (5) being limited by a stop (8, 9).

6 Claims, 1 Drawing Sheet

TENSIONER FOR TRACTION MEANS WITH PREDEFINED TENSIONING DISPLACEMENT

FIELD OF THE INVENTION

A tensioner for a traction means, particularly a belt, comprising a protective plate which is displaceable relative to a stationary machine element, and a tension roller mounted rotatably on a bearing pin for contacting the belt.

BACKGROUND OF THE INVENTION

In a tensioner of the pre-cited type known, for example, from DE-C 39 08 817, a dynamo is fixed within the belt drive on a protective plate which is journalled on a pivot extending perpendicular to a plane of tensioning of the belt. At a distance from the pivot, the protective plate comprises a slot through which a fixing screw is inserted to engage a thread of a stationary machine element. A spring-loaded belt tensioner comprising notches is arranged at another point of the belt drive. One notch is associated to the tension arm and another notch is associated to the housing. To adjust the belt tension, the fixing screw of the dynamo is loosened and the protective plate pivoted, whereby the belt is tensioned. As a result of increasing belt tension, the tension arm pivots as well. As soon as the marks on the tension arm and the housing register, the fixing screw is tightened so that the protective plate is fixed on the stationary machine element. On the one hand, this tensioning device requires a movable protective plate with the dynamo arranged thereon and on the other, the spring-loaded tensioner. The adjustment of the required belt tension can become more difficult due to the fact that the view on the marks is obstructed.

OBJECTS OF THE INVENTION

It is an object of the invention to provide an improved tensioner of the precited type in which no visual control is required and the number of components is reduced.

This and other objects and advantages of the invention will become obvious from the following detailed description.

SUMMARY OF THE INVENTION

The invention achieves the above objects in that the bearing pin comprises an eccentric received on the protective plate, the longitudinal axes of the eccentric and the bearing pin being spaced from one another by an eccentricity, and a pivoting of the bearing pin about the eccentric is limited by a stop. In the tensioner of the invention, the longitudinal axis of the tension roller is pivoted about the longitudinal axis of the eccentric whereby the belt is tensioned to an extent corresponding to double the eccentricity e through which the tension roller is displaced for tensioning the belt. Further pivoting is preventing by the stop so that the bearing pin cannot evade the belt force. The stop can of course also be configured so as to stop the pivoting of the bearing pin before the tension roller has been displaced through double the eccentricity.

The tensioner of the invention offers a particularly favorable method of adjusting the belt tension. At first, the protective plate is pivoted relative to the stationary machine element till the belt comes to bear against the tension roller in the bottom dead center thereof under perceptible tension, particularly thumb pressure. In this position, the longitudinal axes of the eccentric and the tension roller intersect at least approximately, the line of action of the radial tension roller force which is transmitted from the belt to the tension roller, the longitudinal axis of the eccentric being situated between the longitudinal axis of the tension roller and the point of application of the tension roller force.

In a next step, the protective plate is fixed on the stationary machine element. To adjust the required belt tension, the bearing pin is pivoted about the eccentric beyond the upper dead center whereby, in the upper dead center, the tension roller is displaced towards the belt through double the eccentricity relative to the bottom dead center, a further pivoting of the bearing pin being prevented by the stop. Pivoting of the bearing pin is enabled by a preferably polygonal socket for a tool on the end of the bearing pin remote from the protective plate, so that the bearing pin can be pivoted without any problem with the lever of the tool.

The stop for preventing a further pivoting of the bearing pin is required because, after the upper dead center has been overrun, the bearing pin is re-urged towards its bottom dead center by the acting force of the tension roller. A particular advantage of the invention is that the bearing pin no longer needs to be held tight till it is fixed on the protective plate. The degree of eccentricity required depends on the particular belt drive in question and is pre-designed accordingly.

Advantageously, the stop is arranged on the bearing pin and on the protective plate, and is comprised of a recess engaged by a projection. The projection can be constituted, for example, by a pin fixed on the protective plate and the recess by a groove extending coaxially to the longitudinal axis of the eccentric on an end face of the bearing pin.

The protective plate is disengageably fixed on the stationary machine element by fixing screws applied preferably at two points spaced from each other, the screw at one of the points being inserted through a slot of the protective plate which is thus pivotable about the other point.

The eccentric is particularly favorably constituted by a screw which is inserted through a bore of the bearing pin extending parallel to and offset from the longitudinal axis of the bearing pin, and then screwed into the protective plate. Thus, the screw assumes two functions viz., the already described function of an eccentric and the further function of fixing the bearing pin on the protective plate. This is achieved primarily by the fact that the bearing pin is clamped between the screw head and the protective plate.

BRIEF DESCRIPTION OF THE DRAWINGS

The invention will now be described more closely with reference to one example of an embodiment illustrated in three figures.

DETAILED DESCRIPTION OF THE DRAWINGS

Figure 1:
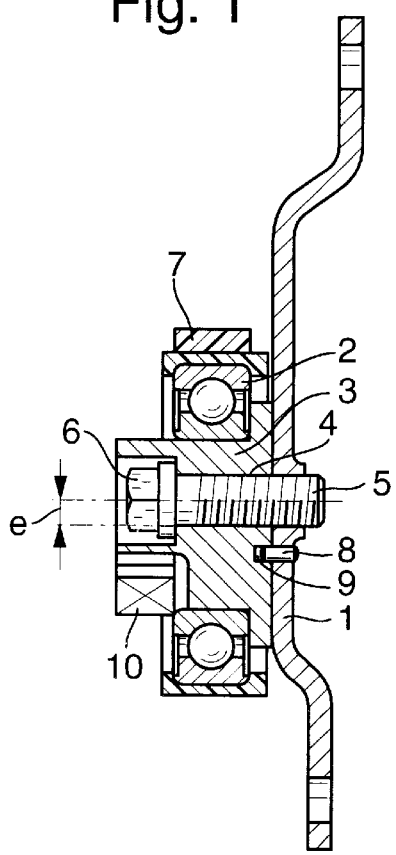
FIG. 1 is a longitudinal cross-section through a tensioner of the invention.

The tensioner shown in FIG. 1 comprises a protective plate 1 which can be fixed on a stationary machine element, not shown. A tension roller 2 is mounted rotatably on a bearing pin 3 which bearing pin 3 comprises a bore 4 which is parallel to and offset from the longitudinal axis of the bearing pin 3 by an eccentricity E. A screw 5 is inserted through the bore 4 and screwed into the protective plate 1 so that the bearing pin 3 can be clamped tight between the screw head 6 and the protective plate 1. The tension roller 2 is pressed against a belt 7. A pin 8 anchored in the protective plate 1 engages into a groove 9 which extends coaxially to the longitudinal axis of the screw 5 on an end face of the bearing pin 3. The bearing pin 3 further comprises a wrench-application surface 10.

Figure 2:
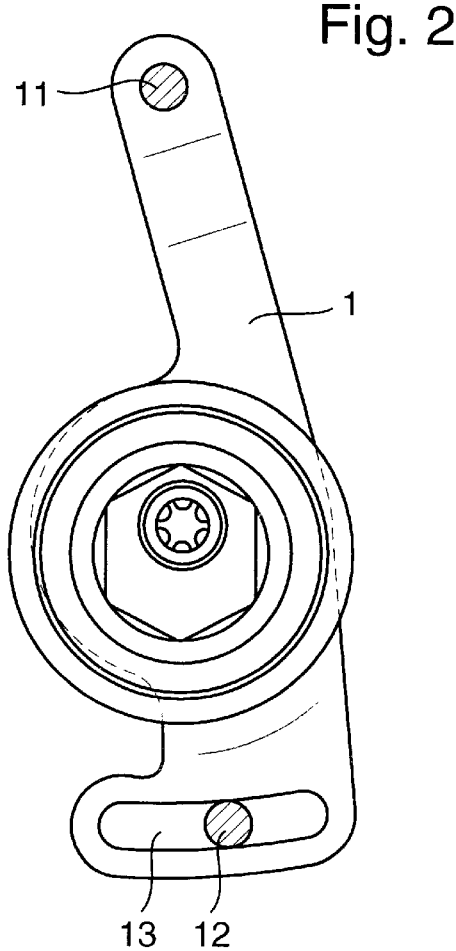
FIG. 2 is a projected view of the tensioner of FIG. 1.

FIG. 2 shows a projected view of the tensioner of FIG. 1 and the protective plate 1 is fixed at its opposite ends on a stationary machine element, not shown, by two fixing screws 11, 12. The fixing screw 12 is inserted through a slot 13 of the protective plate 1 which can therefore pivot about the fixing screw 11. In a pre-adjusting step, the protective plate 1 is pivoted about the fixing screw 11 to such an extent that the belt is slightly tensioned. Following this, a further adjustment is effected to obtain the required belt tension.

Figure 3:
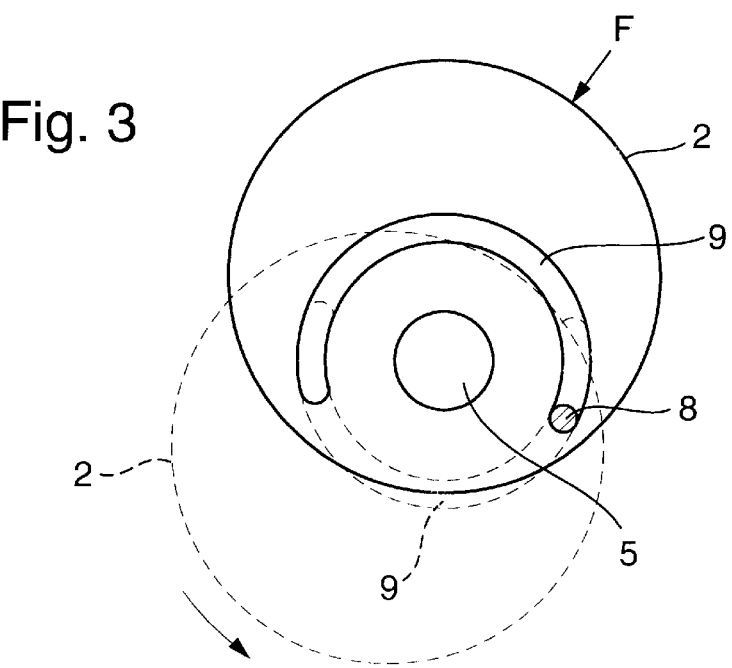
FIG. 3 is a basic sketch illustrating the method of functioning of the tensioner of FIGS. 1 and 2.

The further adjustment of the tensioner of the invention is illustrated in FIG. 3 which only shows the tension roller 2, the eccentric 5, the groove 9 and the pin 8. The hatched lines show the tension roller 2 when pressed against the belt under perceptible tension, particularly thumb pressure. In this position, the tension roller 2 is in its bottom dead center, i.e., the eccentric 5 is as close as possible to the belt. In other words, in the bottom dead center, the longitudinal axes of the eccentric and the tension roller intersect at least approximately, the line of action of the radial tension roller force which is transmitted from the belt to the tension roller, the longitudinal axis of the eccentric being situated between the longitudinal axis of the tension roller and the point of application of the tension force F. The pre-adjustment mentioned above is effected in this position.

With the help of a wrench applied to the wrench-application surface 12, the bearing pin 3 is then turned around the eccentric 5 in anti-clockwise direction beyond the top dead center of the bearing pin 3. A further turning of the bearing pin 3 is not possible because the pin 8 abuts against one of the circumferential ends of the groove 9. Due to the fact that the top dead center has been overrun, the acting tension roller force presses the said end of the groove against the pin 8 so that the bearing pin 3 does not need to be held tight till it is fixed on the protective plate by tightening the screw 5. The required belt tension is now adjusted.

Various modifications of the tensioner of the invention may be made without departing from the spirit or scope thereof and it is to be understood that the invention is intended to be limited only as defined in the appended claims.

What I claim is:

1. A tensioner for a traction means comprising a protective plate (1) which is displaceable relative to a stationary machine element, and a tension roller (2) mounted rotatably on a bearing pin (3) for contacting a belt (7), characterized in that the bearing pin (3) comprises an eccentric (5) received on the protective plate (1), a longitudinal axis of the eccentric (5) and a longitudinal axis of the bearing pin (3) being spaced from one another by an eccentricity e, and a pivoting of the bearing pin (3) about the eccentric (5) being limited by a stop (8, 9).

2. A tensioner of claim 1 wherein the stop (8, 9) is arranged on the bearing pin (3) and on the protective plate (1), and the stop (8, 9) is comprised of a recess (9) engaged by a projection (8).

3. A tensioner of claim 2 wherein the projection is a pin (8) fixed on the protective plate (1) and the recess is a groove (9) extending coaxially to the longitudinal axis of the eccentric (5) on an end face of the bearing pin (3).

4. A tensioner of claim 1 wherein the protective plate (1) is disengageably fixed on the stationary machine element by fixing screws (11, 12) applied at two points spaced from each other, the screw (12) at one of the points being inserted through a slot (13) of the protective plate (1), so that the protective plate (1) is pivotable about the other point.

5. A tensioner of claim 1 wherein the concentric is a screw (5) which is inserted through a bore (4) of the bearing pin (3) extending parallel to and offset from the longitudinal axis of the bearing pin (3), and said screw (5) is screwed into the protective plate (1).

6. A method of adjusting a belt tension with a tensioner of claim 1, comprising the steps of:

pivoting the protective plate (1) relative to the stationary machine element till the belt (7) comes to bear against the tension roller (2) in a bottom dead center thereof under perceptible tension so that, in the bottom dead center, a longitudinal axis of the eccentric (5) and a longitudinal axis of the tension roller (2) intersect at least approximately, a line of action of a radial tension roller force which is transmitted from the belt to the tension roller, and the longitudinal axis of the eccentric (5) is arranged between the longitudinal axis of the tension roller (2) and a point of application of the tension roller force F; fixing the protective plate (1) on the stationary machine element;

pivoting the bearing pin (3) beyond an upper dead center whereby, in the upper dead center, the tension roller (2) is displaced toward the belt (7) through double the eccentricity e relative to the bottom dead center, a further pivoting of the bearing pin (3) being prevented by the stop (8, 9);

fixing of the bearing pin (3) on the protective plate (1).

* * * * *

UNITED STATES PATENT AND TRADEMARK OFFICE
CERTIFICATE OF CORRECTION

PATENT NO.   : 5,820,503
DATED        : October 13, 1998
INVENTOR(S)  : KLAUS BRUCHNER et al It is certified that error appears in the above-indentified patent and that said Letters Patent is hereby corrected as shown below: Title page;

[73] Change "Assignee: INA WALZLAGER SCHAEFFLER oHG, Germany" to read

-- [73] Assignee: INA WALZLAGER SCHAEFFLER oHG, Germany,

Mercedes Benz Aktiengesellschaft, Germany,

ContiTech Antriebssystenne GmbH, Germany--

Signed and Sealed this

Twenty-first Day of September, 1999

Attest:

Q. TODD DICKINSON

*Attesting Officer*         *Acting Commissioner of Patents and Trademarks*